United States Patent [19]
Towne et al.

[11] 3,789,286
[45] Jan. 29, 1974

[54] SPEED CONTROL FOR STEPPER MOTORS BY TORQUE TRANSFER

[75] Inventors: Delbert D. Towne; Michael N. Zell, both of Rochester, Minn.

[73] Assignee: International Business Machines Corporation, Armonk, N.Y.

[22] Filed: Feb. 17, 1972

[21] Appl. No.: 227,069

[52] U.S. Cl.............. 318/696, 198/203, 318/302, 318/332, 271/76
[51] Int. Cl. ........................................ H02k 37/00
[58] Field of Search .......... 271/76, 77, 41; 198/203; 318/332, 302, 303

[56] References Cited
UNITED STATES PATENTS

| | | | |
|---|---|---|---|
| 2,383,360 | 8/1945 | Artzt | 318/303 |
| 2,351,508 | 6/1944 | Hamilton | 318/303 X |
| 3,642,271 | 2/1972 | Davis | 271/41 |
| 2,242,409 | 5/1941 | Anderson | 198/76 |
| 3,217,863 | 11/1965 | Duncan | 198/203 X |
| 3,436,073 | 4/1969 | Christmas | 271/76 |
| 2,329,110 | 9/1943 | Drake | 318/303 |
| 3,586,953 | 6/1971 | Markkanen et al. | 318/254 |
| 3,476,996 | 11/1969 | Fredriksen | 318/254 |

*Primary Examiner*—G. R. Simmons
*Attorney, Agent, or Firm*—Donald F. Voss

[57] ABSTRACT

A document transport includes a stepping motor drive for incrementally advancing documents through a read station. The stepper motor drive ejects the documents from the read station to a continuously running stacker transport which conveys the document to one of two stackers. The stacker transport by means of a belt and pulley drives a gear which meshes with a gear coupled to the stepper motor drive by a one-way clutch whereby if the stepper motor drive tries to run faster than the continuously running drive it picks up the load of the stacker transport and is forced to run at the speed thereof. The stepper motor drive is free to stop or increment at any desired speed but it cannot exceed the speed of the stacker transport without picking up the load thereof. The emitter lead angle of the stepper motor drive is set so that the stepping motor would run faster than the stacker transport but the constraint of the stacker transport via the mechanical phase lock forces the stepper motor to run at stacker transport speed and excess torque of the stepper motor is transferred to the stacker transport. In stepper motor drive systems not having a continuously running transport section, the control load can take the form of a synchronous or induction A.C. motor driven at a predetermined speed, i.e., the regulated speed.

13 Claims, 6 Drawing Figures

SPEED CONTROL FOR STEPPER MOTORS BY TORQUE TRANSFER

BACKGROUND OF THE INVENTION

1. Field of the Invention

This invention relates to apparatus for mechanically controlling the speed of stepper motors and more particularly to apparatus for phase locking article transport sections and applifying the torque of one of the sections and still more particularly to apparatus for mechanically phase locking one article transport section driven by a stepper motor with an adjacent continuously running article transport section and with torque amplification of the stepper motor transport section.

2. Description of the Prior Art

Document handling machines such as document readers and punches usually have a section for incrementally advancing the document through a work station. In more current machines, the incrementing function is performed by a stepper motor. The documents are then ejected from the work station by the steper motor into a continuously running stacker transport section. To avoid tearing or crumbling the document it is necessary to either match the velocities of the two transport sections at the transition point or to permit document slippage. Document handling machines working with fixed length documents are designed so that at the transition point the document is just leaving the control of the incrementing transport section as it is coming under control of the continuously running transport section and the two transport sections are not phase locked. However, document handling machines working with variable length documents cannot be designed whereby the transition point is where the document is just leaving control of the incrementing section and it is coming under control of the continuously running transport section. This could be done only for the shortest document to be transported. Hence, in the past for variable length document handling machines, it has been the practice to advance documents incrementally through the work station with a vacuum belt transport. The continuously running transport section was driven at a speed slightly higher than the vacuum belt transport section. By this arrangement, the documents would never buckle or crumple because the continuously running transport section was designed to run faster than the vacuum transport section and would not tear because the continuously running transport section would merely pull the documents from the vacuum transport section which allowed the documents to slip. This arrangement, although satisfactory for applications not requiring precise incrementing, is quite expensive. In addition to the relatively high cost of the vacuum belt transport, this type of transport is noisy.

The present invention enables the use of a stepper motor drive to incrementally advance variable length documents through the work station. The stepper motor drive can increment the document precisely and is relatively inexpensive. However, the stepper motor drive is advanced by pulses coming from an emitter driven by the stepper motor and under this arrangement the speed of the stepper motor varies with the load placed thereon. The speed of the stepper motor varies considerably particularly when operating at a high stepping rate such as when ejecting the document from the work station. The speed of the stepping motor of course, as in some prior art approaches, can be controlled electrically by providing a control system which would include a reference such as an emitter and the pulses from the stepper motor emitter are advanced or delayed as determined by the reference pulses. Such a control system is relatively expensive. The present invention controls the speed of the stepper motor at the transition point mechanically by torque transfer. This is accomplished by coupling the stepper motor to the continuously running transport section through a one-way clutch. The continuously running transport section functions as a control load. If the stepper motor drive tries to run faster than the continuously running transport section, it picks up the load of this section. The load of the continuously running section is greater than the stepper motor drive torque capability. Hence, the stepper motor drive is forced to run at the speed of the continuously running transport section. Further, because of the one-way clutch, the stepper motor is free to step or increment at any speed which, due to the phase lock, will not exceed the speed of the continuously running transport section. Additionally, since the stepper motor drive cannot run faster than the continuously transport section, its torque can be multiplied by increasing the emitter lead angle to try to make it run faster. This is accomplished by changing the position of the emitter on the stepper motor drive shaft. Torque is transferred from the stepper motor drive to the transport section as the stepper motor drive runs at the regulated speed. The mechanical phase lock ensures that the two transport sections are running at the same speed at the transition point, enables the stepper drive transport to operate intermittently, and facilitates the torque transfer. Further, if for example, the load of the continuously running transport section were not large enough to prevent overdrive, then an additional control load could be coupled to the stepper motor drive by the one-way clutch.

SUMMARY

The principal objects of the invention are to provide a mechanical system for controlling the speed of a stepper motor which (a) is relatively inexpensive, (b) accurately controls the speed of the stepper motor as an article is ejected from a work station, and (c) enables the torque of the stepper motor to be amplified.

DESCRIPTION

Figure 1:
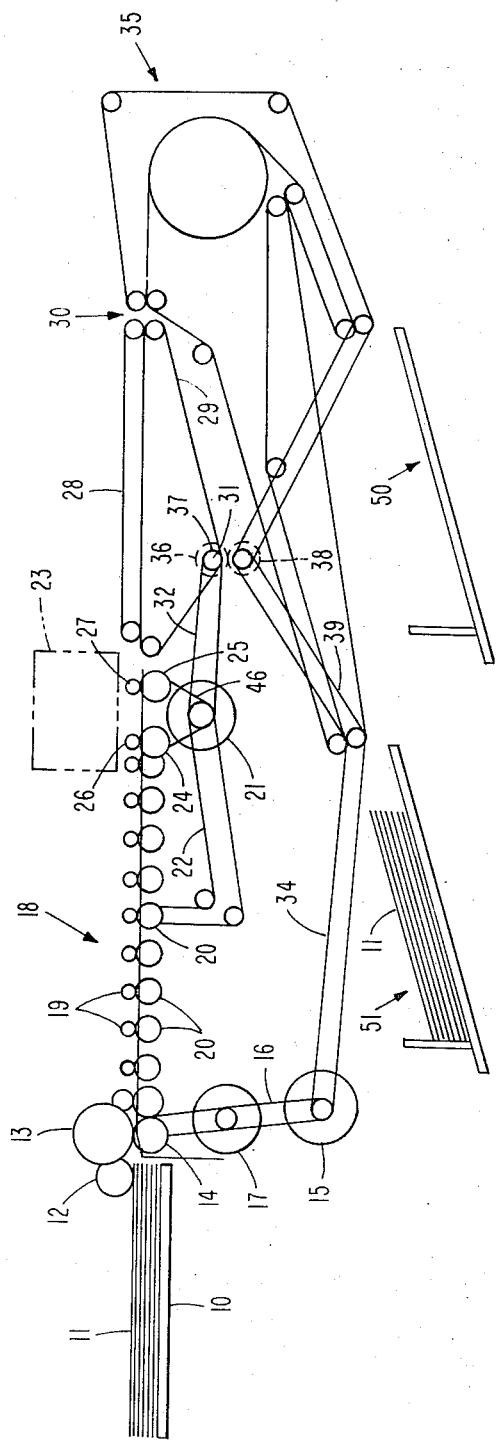
FIG. 1 illustrates the invention as incorporated in a document reader.

With reference to the drawings and particularly to FIG. 1, the invention is shown by way of example as being incorporated into a document reader which includes a hopper platform 10 for supporting documents 11. Documents 11 are fed inseriatum by picker roll 12 to separator roll 13 and cooperating restraint roll 14. The picker roll 12, separator roll 13, and restraint roll 14 are driven by A.C. motor 15 via belt 16 and clutch and brake assembly 17. Documents picked from hopper 10 are separated into a single stream of documents by separator roll 13 and restraint roll 14. The single stream of documents pass through an aligner section 18 consisting of a series of cooperating rolls 19 and 20. The aligner rolls 20 are driven by stepper motor drive 21 via belt 22. The aligner rolls 20 are ganged together by belting not shown.

After the documents pass through aligner section 18, they enter work station 23 which in this instance is a document read station. The documents are incremented through the read station which reads one line of printing at a time on the document. Stepper motor 21 drives incrementing rolls 24 and 25 by means of belt 46. Pressure rolls 26 and 27 cooperate with incrementing rolls 24 and 25 respectively to increment the document through read station 23. Documents leaving read station 23 are transported by conveyor belts 28 and 29 which are also driven by stepper motor 21. The documents are captured between belts 28 and 29 and a series of pressure rollers not shown assure a very positive grip on the document. Conveyor belts 28 and 29 which form an intermediate transport section deliver the documents at point 30 to the continuously running stacker transport section 35. Stacker transport section 35 is driven by motor 15 via belt 36 and functions to transport documents 11 to either stacker 50 or stacker 51. The stacker selection mechanism is not shown because it is not essential to the understanding of this invention.

Figure 4:
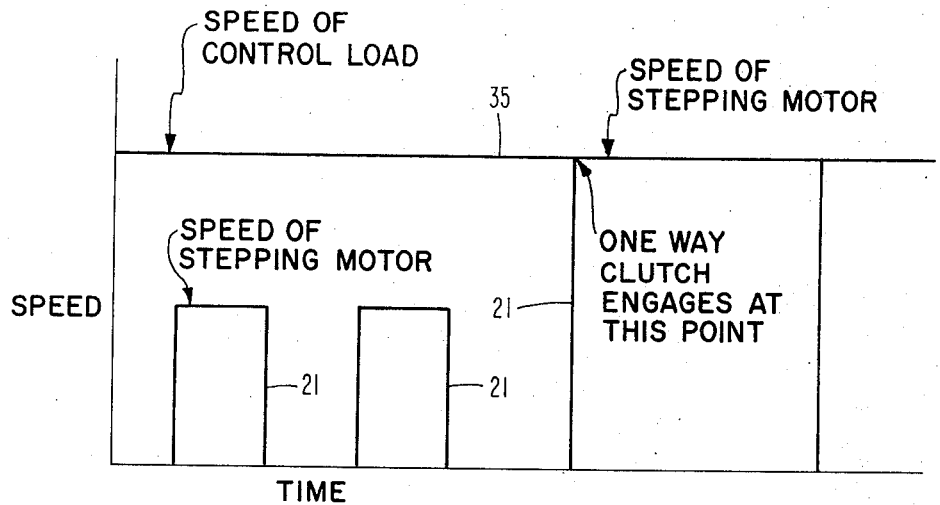
FIG. 4 is a diagram illustrating the speed relationship between the stepper motor drive and the speed of the control load.

Stepper motor 21 drives pulley shaft 31 by means of belt 32. A gear 36 is coupled to shaft 31 by means of a one-way clutch 37 located within gear 36. Gear 36 meshes with gear 38 which is driven by motor 15 via belts 34 and 39. One-way clutch 37 allows stepper motor drive 21 to stop or increment at a predetermined rate less than the speed of the transport section 35 or to run at a slewing rate at the speed of transport section 35. If stepping motor 21 tries to run faster than the speed of transport section 35, it picks up the load of transport section 35 which then forces the stepping motor to run at the speed of transport section 35. This speed control is illustrated in FIG. 4. The speed of the transport section 35 is shown by line 35 and the speed of stepping motor is shown by line 21. It is also seen that stepping motor 21 operates intermittently at a speed less than the speed of stacker transport 35. This is during the time that stepper motor 21 is incrementing the document through read station 23.

Figure 5:
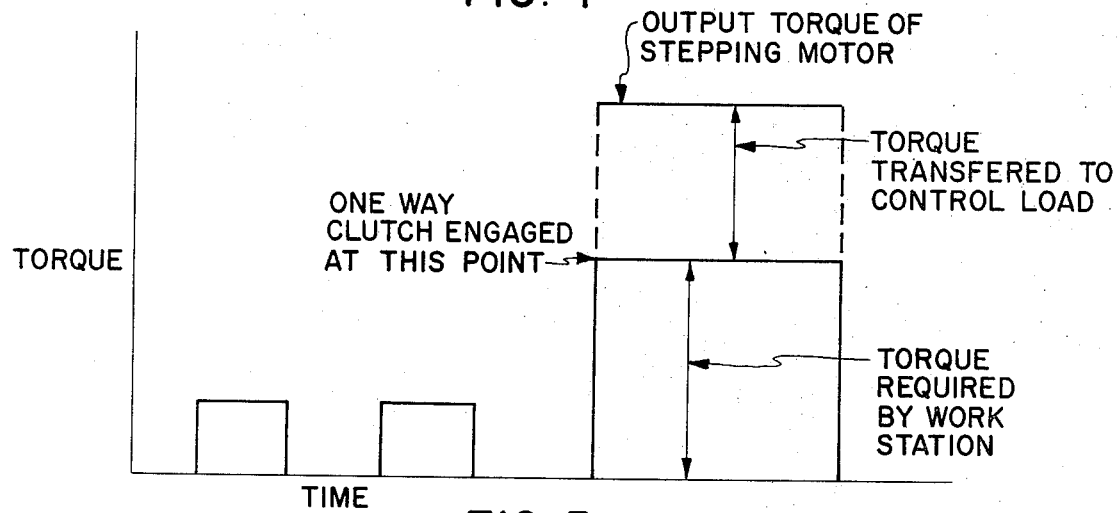
FIG. 5 is a diagram illustrating the relationship between the torque of the stepper motor drive and the torque transfer to the control load when the stepper motor drive is forced to run at the speed of the control load; and, FIG. 6 is a diagram illustrating how the torque transferred to the control load varies as the torque requirements of a work station varies.
Figure 6:
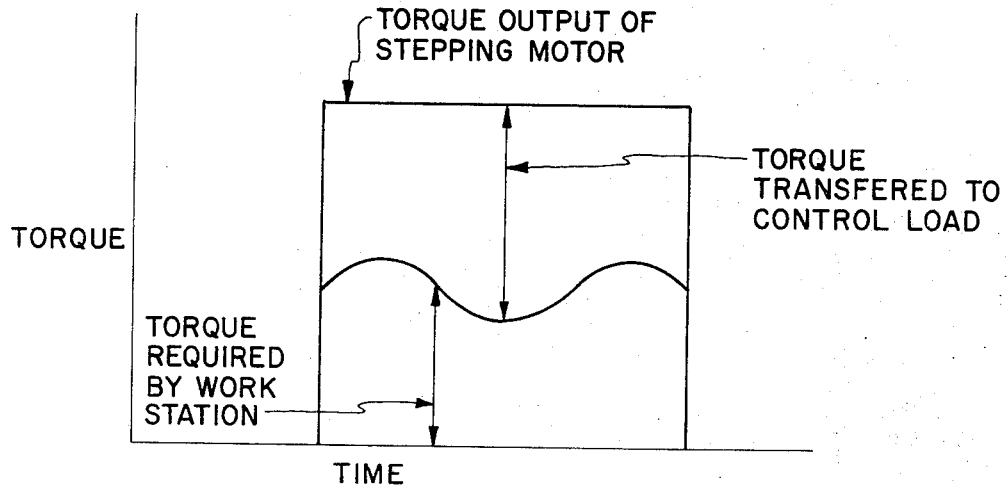

After the document leaves read station 23, it enters the intermediate transport section which includes belts 28 and 29. The stepper motor 21 operates the intermediate transport section at the speed of the stacker transport 35 so that the document passes through the intermediate transport section to the stacker transport section without undue forces placed upon the document. If the stepper motor drive 21 tries to run faster than the stacker transport section 35, torque from the stepper motor drive is transferred to the stacker transport section 35 which forces the stepper motor 21 to run at the speed of the stacker transport section 35. This torque transfer is illustrated in FIG. 5. The amount of torque transferred depends upon the amount of speed that the stepper motor is trying to drive faster than the speed of the stacker transport section 35.

Figure 3:
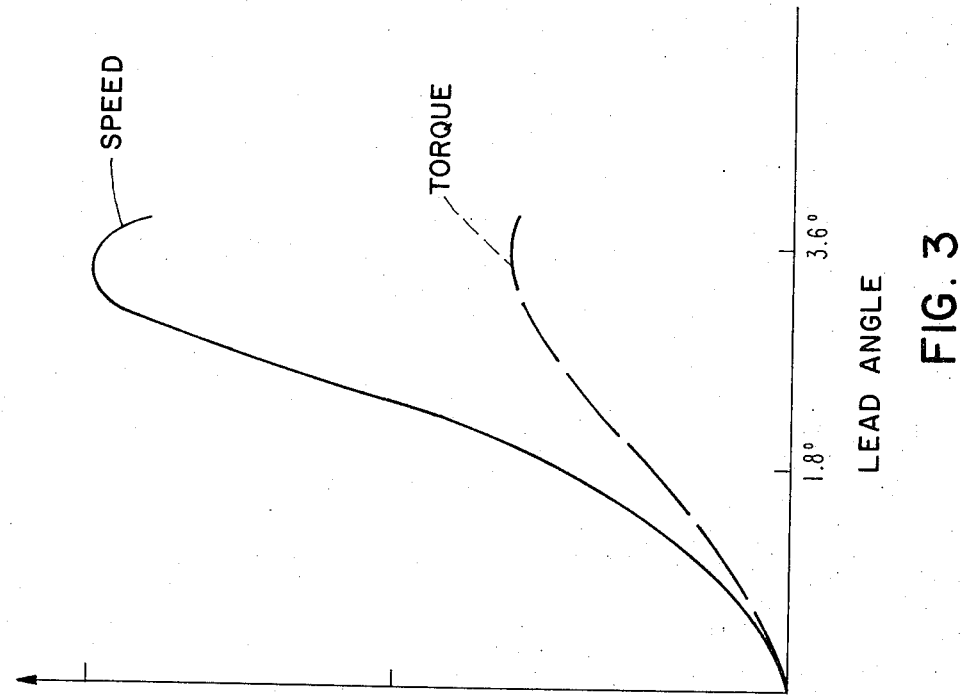
FIG. 3 is a diagram illustrating speed and torque curves varying with the lead angle.
Figure 2:
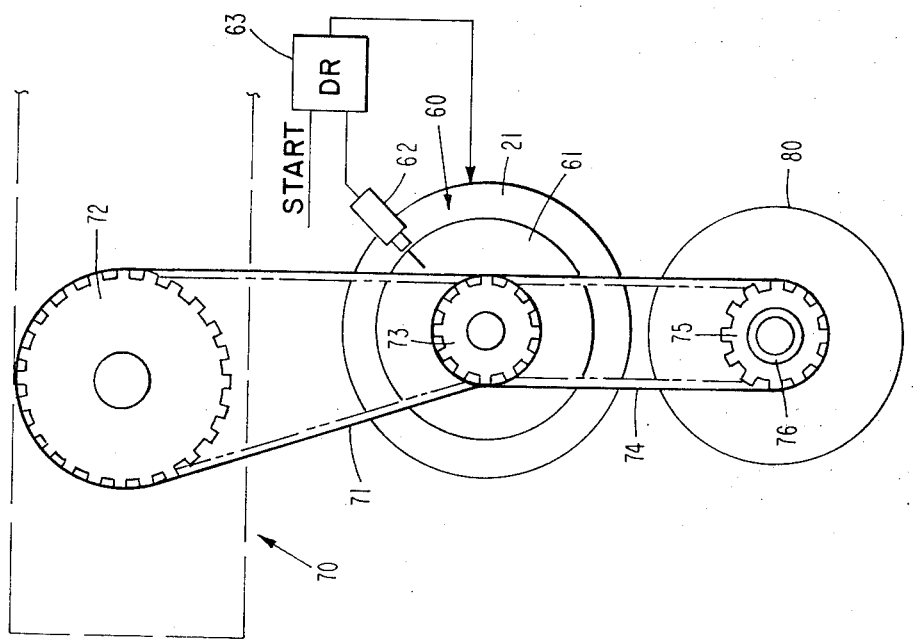
FIG. 2 illustrates an alternate embodiment of the invention showing the stepper motor drive, a work station, and the control load.

The stepper motor 21 is advanced by pulses coming from an emitter 60 driven by stepping motor 21. This is best seen in FIG. 2 where emitter 60 is shown as including emitter wheel 61 and transducer 62. The output pulses generated by transducer 62 are applied to electrical drivers for the stepping motor 21 and these drivers are schematically illustrated by block 63. A start pulse is applied to driver 63 to start stepping motor 21 and thereafter the pulses come from emitter 60. In this particular instance, stepping motor 21 is driving a load at work station 70 via belt 71 and pulleys 72 and 73. Pulley 73 is wide enough to accommodate belt 74 which couples stepper motor 21 to control load 80 via pulley 75 and one-way clutch 76. Control load 80 is an A.C. synchronous motor running at the speed at which stepper motor 21 is to be regulated. Emitter wheel 61 is physically located on the shaft of stepper motor 21 with a lead angle so that stepper motor 21 would run faster than the regulated speed if it were not coupled to control load 80 via the one-way clutch 76. The torque speed and lead angle relationship is shown in FIG. 3. The torque of the stepping motor 21 is at a maximum when the lead angle is set to provide maximum speed. However, by coupling the stepper motor to the control load 80, the speed of the stepping motor is constrained to run at the regulated speed determined by control load 80 and the torque in excess of that required by work station 70 is transferred to control load 80.

From the foregoing, it is seen that the invention provides a mechanical control system for regulating the speed of a stepper motor. It is seen that the speed of the stepper motor is controlled by coupling the output of the stepper motor through a one-way clutch to a control load which is driven at the desired regulated speed. The stepper motor is set to run faster than the speed of the control load but is prevented from doing so by the control load.

We claim:

1. A mechanical speed control system for a stepper motor adapted to advance articles through a work station and having a predetermined torque capability comprising
   means for operating said stepper motor at a plurality of different speeds including a speed greater than a predetermined regulated speed,
   a control load greater than said torque capability of said stepper motor and constantly driven at said predetermined regulated speed, and,
   uni-directional coupling means for coupling said control load to said stepper motor to force the same to run at said regulated speed when said stepper motor is operated at said speed greater than said regulated speed.

2. The mechanical speed control system of claim 1 wherein said means for coupling said control load to said stepper motor is a one-way clutch.

3. The mechanical speed control system of claim 1 wherein said control load is a constantly running A.C. motor.

4. The mechanical speed control system of claim 1 wherein said control load is a document stacker transport.

5. The mechanical speed control system of claim 1 wherein said means for operating said stepper motor at a speed greater than a predetermined regulated speed comprises an emitter connected to be driven by said stepper motor to provide a series of stepping pulses and having a lead angle set to run said stepper motor faster than said regulated speed, electrical drivers connected to said stepper motor and responsive to pulses from said emitter to energize said stepper motor and means for applying an advance pulse to said drivers.

6. A mechanical phase lock for document transports comprising a pair of transport sections, one of said sections being intermittently driven at predetermined speeds, the other being continuously driven at a predetermined speed,
a unidirectional clutch for connecting said one transport section to drive said other transport section, and
means for connecting a load to said other transport section greater than the torque capability of said one transport section and thereby prevent said one transport section from exceeding said predetermined speed of said other transport section.

7. The mechanical phase lock for document transports as in claim 6 wherein the highest predetermined speed of said one transport section is higher than the speed of said other transport section whereby the torque of said one transport section is increased as said one transport section is forced to run at the speed of said other transport section.

8. The mechanical phase lock for document transports as in claim 6 wherein said one transport section is driven by a stepping motor.

9. The mechanical phase lock for document transports as in claim 8 wherein said stepping motor drives an emitter having a predetermined lead angle for generating pulses for driving said stepping motor.

10. The mechanical phase lock for document transports as in claim 9 wherein said emitter leading angle is set to increase the torque of said stepping motor.

11. A mechanical phase lock and torque amplifier for document transports comprising a pair of transport sections, one of said sections being intermittently driven at predetermined speed, the other being driven continuously at a predetermined speed,
a stepping motor connected to drive said one transport section at said predetermined speeds,
an emitter mounted to be driven by said stepping motor and having a lead angle so as to generate pulses for driving said stepping motor,
a motor for continuously driving said other transport section at a predetermined speed,
a first driven member driven by said motor,
means for connecting a load exceeding the torque capability of said stepper motor to said first driven member,
a second driven member mounted to be driven by said first driven member, and
a one way clutch for coupling said stepper motor to said second driven member to couple said stepper motor to said load so that said stepping motor is prevented from exceeding said predetermined speed of said motor.

12. The mechanical phase lock and torque amplifier for document transports as in claim 11 wherein said first and second driven members are gears.

13. The mechanical phase lock and torque amplifier for document transports as in claim 11 wherein the emitter lead angle is set to increase the torque of said stepper motor.

* * * * *